United States Patent Office 3,809,757
Patented May 7, 1974

3,809,757
FLAVOURING AGENT
Joyce M. Kiley and Roger T. Kiley, Bricktown, N.J., assignors to Societe d'Assistance Technique pour Produits Nestle S.A., Lausanne, Switzerland
No Drawing. Filed Sept. 17, 1971, Ser. No. 181,623
Int. Cl. A23l 1/26; C11b 7/00
U.S. Cl. 426—223                                    13 Claims

ABSTRACT OF THE DISCLOSURE

A flavoring agent is prepared by treating orange oil with propylene glycol and a hydrocarbon solvent and recovering a propylene glycol phase substantially free of hydrocarbon solvent.

---

The present invention is concerned with the preparation of a flavoring extract from orange oil.

Essential oils of citrus fruit such as orange, lemon, lime, grapefruit are widely used both in the food and perfume industries. Whilst supplies of orange oil are relatively abundant, the world production of oils from other citrus fruit is on a much smaller scale, which with increasing demand leads to shortages. Whilst synthetic oils may be produced by combining in appropriate proportions a large number of the individual substances present in natural citrus oils, the resulting products frequently lack the true flavor character of the natural product.

An object of the present invention is to provide a flavoring extract of orange oil which may be used as a base for the preparation of flavorings having the character of other citrus oils.

Another object of the invention is to provide novel flavoring agents having the flavor characteristics of natural citrus oils.

In accordance with the present invention, it has been found that a citrus flavoring base may be prepared from orange oil by selective extraction using propylene glycol and a hydrocarbon solvent. Preferably, the solvent is hexane, heptane or petroleum ether. The extraction results in the removal with the hydrocarbon solvent of the characteristic notes associated with the aroma and flavor of the orange, leaving a propylene glycol extract having a "citrus" character, which is particularly useful as a base for the preparation of specific flavorings such as lime, grapefruit, lemon or tangerine.

The starting material for the process may be either single or five-fold orange oil, the latter being preferred, and the relative proportions of oil, solvent and hydrocarbons will be chosen having regard to the strength of the oil. As taught in the prior art (e.g., Guenther, The Essential Oils, vol. 1, page 220 [1948]), concentrated oils may be prepared, suitably by fractional distillation to remove a part of the hydrocarbons, and the concentrated oils are referred to as twofold oils, fivefold oils, or similar folded oils, the degree of folding being the same as the degree of concentration. The relative proportions of oils, solvent and hydrocarbon will be chosen having regard to the strength—or "fold"—of the oil. Where single-fold oil is used, for every 10 parts by volume of oil, a very satisfactory extract is obtained with 2 to 4 parts of propylene glycol and 30 and 40 parts of hydrocarbon solvent. For 5-fold oil, on the other hand, it has been found preferable to adjust the proportions as follows:

|  | Parts | |
|---|---|---|
|  | Possible | Preferred |
| 5-fold orange oil | 20–40 | 25–35 |
| Solvent | 30–70 | 45–55 |
| Propylene glycol | 10–25 | 15–25 |

The extraction may be carried out batchwise or in a continuous manner. For relatively small-scale operations a batch system, using an agitated tank or similar vessel is satisfactory, the materials being charged in the selected proportions and thoroughly mixed. The tank should be provided with a bottom outlet allowing for separation of the phases. Continuous counter-current extraction may advantageously be carried out in a stirred column of conventional design, or in a centrifugal extractor. The extraction is preferably carried out at or slightly below ambient temperatures.

Upon completion of the extraction, two streams are recovered—a solvent phase, containing principally terpenes and other substances responsible for orange notes, and a propylene glycol phase having a basic "citrus" flavor and aroma. The solvent phase may be fractionated for recovery of solvent and aromatic constituents whereas the propylene glycol extract, usually containing between 10 and 30% orange oil components, may be used directly in the preparation of flavorings.

As has been noted, the combination of propylene glycol and hydrocarbon solvent results in a selective, preferential extraction of certain components of orange oil into the propylene glycol phase. It has, surprisingly, been observed that substances which are chemically similar to propylene glycol, notably glycerol, do not give satisfactory extracts. The selectivity of the extraction system may be demonstrated by comparison of the composition of the propylene glycol extract with 5-fold orange oil, as determined by gas chromatography. For the purpose of simplification, only the percentage amounts of the principal substances are listed:

|  | Percent | |
|---|---|---|
| Substance | Propylene glycol extract | 5-fold orange oil |
| Limonene | 59.5 | 86.1 |
| Linalool | 14.8 | 2.3 |
| Decanal | 8.8 | 3.9 |
| Terpinen-4-ol | 0.2 | Trace |
| Neral | 0.5 | 0.2 |
| B-caryophyllene | 2.4 | 0.8 |
| Geranial | 2.2 | 0.8 |
| l-carvone | 0.2 | Trace |
| Unidentified | 1.2 | Trace |

The invention is illustrated by the following examples, in which the parts are by volume.

EXAMPLE 1

210 parts of single-fold orange oil are extracted in a stirred vessel at ambient temperature with 710 parts of n-heptane and 80 parts of propylene glycol. After two minutes' extraction the phases are separated by decantation, to provide 90 parts of propylene glycol extract of orange oil. The heptane layer may be distilled for recovery of the solvent for recycling and of the aromatic substances extracted.

EXAMPLE 2

30 parts of five-fold orange oil are extracted at about 10° C. with 50 parts of petroleum ether and 20 parts of propylene glycol. After 5 minutes the phases are separated by decantation, yielding 28 parts of propylene glycol extract of orange oil.

EXAMPLE 3

A flavoring which may be used as a substitute for 5-fold lemon oil is prepared by mixing the following substances:

|  | Parts |
|---|---|
| Propylene glycol extract of orange oil prepared as described in Example 2 | 50.0 |
| α-Terpinene | 0.2 |
| β-Pinene | 2.2 |

|  | Parts |
|---|---|
| Citral (Neral and Geranial) | 25.0 |
| γ-Terpinene | 1.0 |
| Terpinolene | 0.5 |
| Linalool | 0.1 |
| d-Limonene | 1.0 |
| Ethanol | 10.0 |

EXAMPLE 4

A flavoring suitable as a replacement for 5-fold lime oil is prepared from the following substances:

|  | Parts |
|---|---|
| Propylene glycol extract of orange oil prepared as described in Example 2 | 500 |
| Ethanol | 46.2 |
| d-Limonene | 0.50 |
| β-Terpinene | 2.2 |
| β-Pinene | 4.2 |
| Citral (Neral and Geranial) | 8.8 |
| γ-Terpinene | 0.22 |
| Linalool | 0.22 |
| Terpinolene | 4.1 |
| α-Terpineol | 0.82 |

EXAMPLE 5

A flavoring suitable as a replacement for 5-fold grapefruit oil is prepared from the following substances:

|  | Parts |
|---|---|
| Propylene glycol extract of orange oil prepared as described in Example 2 | 600 |
| Linalool | 0.49 |
| d-Limonene | 8.0 |
| β-Pinene | 1.6 |
| Geraniol | 0.62 |
| Ethanol | 22.4 |
| Citronellal | 0.15 |
| California single-fold grapefruit oil | 11.16 |

We claim:

1. A process for preparing a flavoring agent which comprises treating orange oil simultaneously with propylene glycol and a hydrocarbon solvent and then recovering a propylene glycol phase substantially free of hydrocarbon solvent.

2. A process according to claim 1 in which the hydrocarbon solvent is hexane, heptane or petroleum ether.

3. A process according to claim 1 in which the orange oil is a single, five-fold or similar folded oil.

4. A process for preparing a flavoring agent which comprises treating about 20 to 40 parts by volume of five-fold orange oil simultaneously with about 10 to 25 parts by volume of propylene glycol and about 30 to 70 parts by volume of a hydrocarbon solvent and then recovering a propylene glycol phase substantially free of hydrocarbon solvent.

5. A process according to claim 4 in which the hydrocarbon is hexane, heptane or petroleum ether.

6. A process for preparing a flavoring agent which comprises treating about 25 to 30 parts by volume of five-fold orange oil simultaneously with about 15 to 20 parts by volume of propylene glycol and about 45 to 55 parts by volume of a hydrocarbon solvent selected from the group consisting of hexane, heptane and petroleum ether and then recovering a propylene glycol phase substantially free of hydrocarbon solvent.

7. A process for preparing a flavoring agent which comprises treating about 10 parts by volume of single-fold orange oil simultaneously with about 2 to 4 parts by volume of propylene glycol and about 30 to 40 parts by volume of a hydrocarbon solvent and then recovering a propylene glycol phase substantially free of hydrocarbon solvent.

8. A process according to claim 7 in which the hydrocarbon solvent is hexane, heptane or petroleum ether.

9. A citric flavoring base consisting essentially of that fraction of orange oil which is characterized by solubility in the propylene glycol phase of a system comprising orange oil, propylene glycol and a hydrocarbon solvent.

10. A citric flavoring base consisting essentially of that fraction of orange oil which is characterized by solubility in the propylene glycol phase of a system comprising about 10 parts by volume of single-fold orange oil, about 2 to about 4 parts by volume of propylene glycol, and about 30 to about 40 parts by volume of a hydrocarbon solvent.

11. The base of claim 10, in which the hydrocarbon is selected from the group consisting of hexane, heptane, and petroleum ether.

12. A citric flavoring base consisting essentially of that fraction of orange oil which is characterized by solubility in the propylene glycol phase of a system comprising about 20 to about 40 parts by volume of 5-fold orange oil, about 10 to about 25 parts by volume of propylene glycol, and about 30 to about 70 parts by volume of a hydrocarbon solvent.

13. The base of claim 12, in which the hydrocarbon is selected from the group consisting of hexane, heptane, and petroleum ether.

References Cited

UNITED STATES PATENTS

| 3,294,550 | 12/1966 | Ikedd | 99—140 R |
| 2,435,744 | 2/1948 | Hartman | 99—140 R |
| 1,384,681 | 7/1921 | Smith | 99—140 R |
| 2,754,215 | 7/1956 | Evans | 99—140 R |
| 3,340,250 | 9/1967 | Sair | 99—140 R |
| 3,666,496 | 5/1972 | Honey | 426—223 X |
| 2,712,008 | 6/1955 | Kirchner | 260—236.6 |
| 2,975,170 | 3/1961 | Herrick | 260—236.6 |

OTHER REFERENCES

"Webster's New International Dictionary," 2nd ed., 979, G & C Merriam Co., Springfield, Mass., 1957.

MORRIS O. WOLK, Primary Examiner

S. MARANTZ, Assistant Examiner

U.S. Cl. X.R.

260—236.6; 426—369, 429

UNITED STATES PATENT OFFICE
CERTIFICATE OF CORRECTION

Patent No. 3,809,757　　　　　　　Dated May 7, 1974

Inventor(s) Joyce M. and Roger T. Kiley

It is certified that error appears in the above-identified patent and that said Letters Patent are hereby corrected as shown below:

Column 3, line 14, "$\beta$-Terpinene" should read
--$\alpha$-Terpinene--.

Signed and sealed this 1st day of October 1974.

(SEAL)
Attest:

McCOY M. GIBSON JR.
Attesting Officer

C. MARSHALL DANN
Commissioner of Patents